(12) United States Patent
Kawas et al.

(10) Patent No.: US 9,194,372 B2
(45) Date of Patent: Nov. 24, 2015

(54) DEVICE, SYSTEM AND METHOD TO LOWER STARTING TORQUE FOR ELECTRICAL SYSTEM

(75) Inventors: Percy Kawas, Los Altos, CA (US); Gulnar Kawas, Los Altos, CA (US)

(73) Assignee: Percy Kawas, Los Altos, CA (US)

( * ) Notice: Subject to any disclaimer, the term of this patent is extended or adjusted under 35 U.S.C. 154(b) by 765 days.

(21) Appl. No.: 13/357,145

(22) Filed: Jan. 24, 2012

(65) Prior Publication Data

US 2012/0187684 A1 Jul. 26, 2012

Related U.S. Application Data

(60) Provisional application No. 61/436,275, filed on Jan. 26, 2011.

(51) Int. Cl.
*F03D 9/00* (2006.01)
*F03D 7/02* (2006.01)

(52) U.S. Cl.
CPC ............ *F03D 9/002* (2013.01); *F03D 7/026* (2013.01); *F05B 2270/32* (2013.01); *Y02E 10/723* (2013.01); *Y02E 10/725* (2013.01)

(58) Field of Classification Search
CPC ........................................ F03D 7/026
USPC ................... 700/90, 286, 287, 289, 290
See application file for complete search history.

(56) References Cited

U.S. PATENT DOCUMENTS

| | | | |
|---|---|---|---|
| 5,512,811 A | 4/1996 | Latos et al. | |
| 5,652,485 A * | 7/1997 | Spiegel et al. | 318/147 |
| 6,323,625 B1 | 11/2001 | Bhargava | |
| 6,605,928 B2 | 8/2003 | Gupta et al. | |
| 6,911,742 B2 | 6/2005 | Gupta et al. | |
| 7,095,128 B2 * | 8/2006 | Canini et al. | 290/44 |
| 7,303,369 B2 * | 12/2007 | Rowan et al. | 415/4.2 |
| 8,120,194 B2 * | 2/2012 | Hoffmann et al. | 290/44 |
| 8,128,362 B2 * | 3/2012 | Andersen et al. | 416/1 |
| 2006/0273595 A1 * | 12/2006 | Avagliano et al. | 290/44 |
| 2007/0040385 A1 * | 2/2007 | Uchiyama | 290/44 |
| 2007/0098563 A1 * | 5/2007 | Rowan et al. | 416/244 R |
| 2010/0060001 A1 * | 3/2010 | Gabrys | 290/44 |
| 2011/0031756 A1 | 2/2011 | Gabrys | |

* cited by examiner

*Primary Examiner* — Mohammad Ali
*Assistant Examiner* — Ziaul Karim
(74) *Attorney, Agent, or Firm* — Geeta Kadambi; Riddhi IP LLC (57) ABSTRACT

The present disclosure describes lowering of the starting torque for an alternator or motor. The disclosure also describes the integrated torque management system, torque control logic and torque control method. The current process may be adopted for any motor or alternator that has to manage the starting torque for optimal performance. The disclosure also provides a method, system and a device to allow any energy generating system to rotate at lower speeds to improve the efficiency of power generators.

9 Claims, 4 Drawing Sheets

FIGURE 3  Torque Control Method 300

FIGURE 4

DEVICE, SYSTEM AND METHOD TO LOWER STARTING TORQUE FOR ELECTRICAL SYSTEM

CROSS REFERENCE TO RELATED APPLICATIONS

The present application is a non-provisional application of US provisional application 61/436,275 filed on Jan. 26, 2011, the contents of which are incorporated herein by reference in its entirety.

FIELD OF TECHNOLOGY

This disclosure relates generally to a device, system and method to lower the starting torque for an electrical system. More specifically it relates to a supplemental device, system and method for any machine.

BACKGROUND

All power generating systems such as diesel or gas power generators, wind turbines, vehicle and motors etc., have a starting torque. For example, wind turbines have a start and stop speed and a cut-in wind speed.

The two common methods of capturing wind power are Horizontal Axis Wind Turbines (HAWT) or Vertical Axis Wind Turbines (VAWT). VAWT using lift-type turbine blades. This technology has been studied and analyzed using the Darrieus turbine since the mid-1930. The technology has been well understood and researched extensively by NASA and other research institutions. Today, lift type VAWTs are commonly available, the dominant suppliers being from China.

Some of these VAWT wind turbines may stop in a position such that restarting them would require higher wind velocities. This is particularly noted with Darrieus wind turbines. There is a lot of prior art on what can be used to self-start a Darrieus wind turbine. One method of self-starting Darrieus wind turbine is disclosed in Garby et al. (US2011/0031756). Garby et al. describes using magnetic bearings that can use used to create an axial lift that reduces the axial load on the bearings, which in turn reduces the starting torque. Noteworthy in the description in this reference are the benefits of reduced torque and is shown by FIG. 10 through FIG. 12. In this invention electrical power is applied to the bearings creating a magnetic force to overcome the starting torque issue.

Another method described by Latos et al. (U.S. Pat. No. 5,512,811) is to convert electrical energy to mechanical energy to start a turbine engine. Once started, the electronics described in the invention shows how the mechanical energy can be converted back to electrical energy and stored.

Gupta et al. (U.S. Pat. No. 6,911,742) describes a gas driven turbine and a permanent magnet alternator rotating on a common shaft. A control circuit during a startup mode switches the inverter circuit to the starter to wind down the alternator and during the power-out mode switches to the inverter circuit. Gupta et al. also describes in (U.S. Pat. No. 6,605,928) how the alternator functions as a motor to raise the speed of the turbine at a safe ignition speed.

Bhargava et al. (U.S. Pat. No. 6,323,625) describes a similar method as Gupta et al. however, spins the turbine up to a safe speed. It is shown how the embedded electronics provides power through the AC output circuit for this function.

The idle windmills do not provide consistent power supply and reliable energy source to the grid or other energy consumers. Inconsistency in supply of power is detrimental for the users and utility companies of wind turbines or motors as a source of alternate energy. There is need to harness wind energy and provide reliable consistent power supply to the grid.

SUMMARY

The present application discloses a device, system and method for a starting torque reduction that is a supplement to an electrical system and a mechanical system. In accordance with the present disclosure, an alternator or motor is connected to the main turbine rotor or main transmission rotor making possible both starting of the turbine as well as generation of electrical power or initializing the rotation of the object attached to the transmission rotor. The electrical system described herein allows the alternator/motor to start and to operate at various speeds with the output power frequency and voltage unrelated to the alternator/motor speed. This further enables to manage the idle windmill farm efficiently because when the wind is lower than the startup speed the windmills are idle because there is insufficient kinetic energy in the wind to provide the necessary starting torque. In one embodiment, the device, method and system may be used for increasing the torque as well.

In one embodiment, the outside wind speed is sensed by the anemometer to provide analog/digital signal to the converter. In another embodiment, only a pulse is applied to the alternator and not a continuous supply. In another embodiment, a tachometer is attached as a rotor sensor to the converter to aid the mechanical device and reduce the starting torque.

In one embodiment, a device comprising of a torque control logic which includes control logic, rotor sensor along with other devices such as an anemometer, pulse generator, power generator sensor, alternator, battery, solar panel, convertor, power controller and turbine/motor, is described. In another embodiment, the torque control logic as a device may be integrated, pluggable or built in to existing torque management tool or motor control or other control.

In one embodiment, a method of using the torque control logic to reduce the torque for starting the motor, turbine or any other motion related engine is described. In another embodiment, torque control logic is augmented with torque control logic to help with the starting torque. In another embodiment, the torque control logic is used by the existing system to reduce the starting torque. The entire torque control logic may also be a supplemental unit for the existing system, which may be pluggable when required.

In another embodiment, a method of sensing the wind speed by the anemometer, and feeding the information to the converter. The converter, in another embodiment feeds the information to the torque control logic. In one embodiment, a preset value database is created with user-defined values for wind speed, wind direction, rotor rpm, rotor speed; a user defined preset value frequency, pulse width and corresponding voltage.

In one embodiment, a signal received from the anemometer which may be analog or digital is received by the converter. In another embodiment, the converter may transform the input as an output from analog to digital or digital to analog depending on the type of device.

In one embodiment, the rotor sensor is sensing the data (voltage or pulses) of the turbine or the motor. In another embodiment the rotor sensor relays the information about the voltage or pulses of the turbine or the motor to the motion logic analyzer. In another embodiment the motion logic analyzer converts the voltage or pulses from the rotor sensor and converts that to the speed of the turbine and/or motor in a compatible format for the torque control logic.

In one embodiment, logic control analyzes the data received from the preset value database, converter, and motion logic analyzer in the torque control logic. The torque control logic calculates based on the analyzed data whether the pulse generator should generate a pulse or not to generate a pulse as a decision. In another embodiment, transmitting the decision to a pulse generator for further processing. In one embodiment combining the decision of the torque control logic and the level of stored charge of the battery the pulse generator creates an electrical pulse. In another embodiment sending the electrical pulse to an alternator.

In one embodiment, the pulse generator sends an electrical pulse to the alternator, which in turn acts as a motor. In another embodiment, programming the width and duration of the pulse depending on the need to overcome the inertia and the initial torque to get the turbine or motor started. In another embodiment, repeating the generated pulse at a user defined preset value frequency and pulse width till the motor or alternator reaches the preset value speed. Once the motor starts and till it achieves its full speed the pulse generator may keep sending the generated pulse and pulse width and then once the full capacity of independent for the rotation of the turbine or the motor has reached the generated pulse and the pulse width may stop.

In another embodiment, a battery or a capacitor provides power to the pulse generator. Once the turbine or motor starts to function the battery or capacitor is recharged. The charging of the battery or capacitor may be done while the power pulse or gap pulse is being sent to the turbine or motor.

The alternator sends the power to the Power Generator Sensor. In one embodiment, the alternator provides analog/digital signal to the power generator sensor. In another embodiment the power generator sensor relays the information about the voltage or pulses of the alternator to the charge logic.

In another embodiment the motion logic analyzer converts the voltage or pulse from the rotor sensor and transforms the data to correspond to the speed of the turbine and/or motor in a compatible format for the charge logic.

In one embodiment, charge logic analyzes the data received from the preset value database, motion logic analyzer and the power generator sensor. The charge logic calculates based on the analyzed data whether the power needs to be generated or not. In another embodiment, transmitting the decision from the charge logic is performed to a power controller for further processing.

In one embodiment combining the data from various sources comprising of the decision of the charge logic, power level from the external power source, the charge level of the power storage device and/or the power from the alternator/motor, the power controller provides a method and system for the necessary power to charge the power storage device.

The power controller may be built with Maximum Power Point Tracker (MPPT) charger or inverter to store power in battery, capacitor etc. Solar panels, in one embodiment may be used to recharge the power storage device. The power storage device may be recharged using power generated by the system (turbine and/or motor), inductive power, RF power etc.

In another embodiment, an overcharge of power to the storage device and/or to the turbine by the power pulse may be logically controlled by the torque control logic, which has built in algorithm to deal with this function.

In one embodiment, a frequency counter is used to compare the preset value for the torque reduction. In another embodiment, a lower control threshold for generating the power pulse is controlled by torque control logic. In another embodiment, a higher power pulse is curtailed using the torque control logic so that the turbine or the motor is not over charged. In one embodiment, a protective diode or relay may also be implemented as a component to protect the device and/or battery from power surges and/or excessive power from the torque control logic or the power storage device.

In another embodiment, the torque control logic calculates the desired starting torque that is necessary to start the alternator/motor. In one embodiment, the torque control logic provides starting torque to the existing system.

In one embodiment, a method to harness the wind energy to lower starting torque for a turbine or motor that will enable a turbine to create electricity or a motor to start functioning is described. In one embodiment, the power pulse generated by the torque control logic may be delayed using the input from the motion logic analyzer, wind speed and preset wind speed.

The torque management system, in one embodiment, comprises of torque control logic module, wind speed assessment module, signal conversion module, power generator sensor module, motion logic analyzer module, charge logic module, pulse generator module, rotor sensor module, power controller module, power storage device module, external load device module and preset value database module. All or some of these modules may not be included in the torque management system as the modularity will enable systems to be built economically depending on the requirement of modular configuration. So the hardware device is supported by a firmware comprising of several modules. In another embodiment, the firmware torque management system may be embedded in a processor, may be implemented using cloud computing, remote computing, and used as a standalone software in a computer readable medium.

In one embodiment, the calculation of motion sensing of the turbine and/or motor is done by the Motion Logic Analyzer. The Motion Logic Analyzer communicates the speed of the turbine and/or motor to the Control Logic. In another embodiment, the method further comprises of generating a power pulse to start the turbine and/or motor and reducing the starting torque for the turbine and/or motor. In one embodiment, starting the pulse power is calculated comparing the preset wind speed for that particular turbine and/or motor and motion of the turbine and/or the motor at that particular instance.

In one embodiment, the pulse generated by the Pulse Generator may be delayed by the Control Logic using the input from the Motion Logic Analyzer, wind speed and preset wind speed from Preset Value Database.

The device, method and system disclosed herein may be implemented in any means for achieving various aspects, and may be executed in a form of a machine-readable medium embodying a set of instructions. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings, claims and the detailed description that follows.

DETAILED DESCRIPTION

Several device, method and system for reducing the starting torque for a turbine and/or motor is disclosed in the instant description. These device, method and system may also be used for increasing the torque for a turbine and/or motor. Although the present embodiments have been described with reference to specific example embodiments, it will be evident that various modifications and changes may be made to these embodiments without departing from the broader spirit and scope of the various embodiments.

Figure 1:
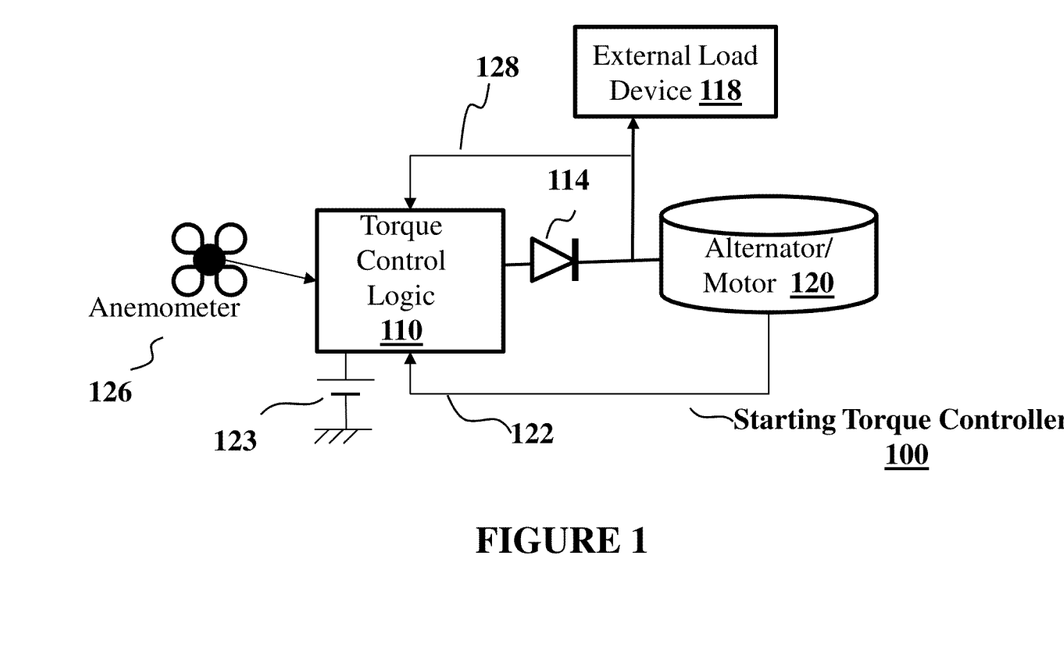
FIG. 1 is a diagrammatic representation of starting Torque Controller (torque controller) 100.

FIG. 1 discloses a starting torque controller 100. Diesel or gas generator may use this method to start for improving the overall system efficiency. This further enables idle windmill farm to operate efficiently because when the wind is lower than the startup speed, the windmills are idle. The alternator may use this method to start the windmills in low wind speeds, thereby lowering the startup speed. The starting torque is prevalent in all alternators used for producing power. This starting inertia also called starting torque thus prevents the alternator from producing power at low wind speeds. The starting torque is also prevalent in diesel or gas generators, requiring significant starting effort. Once the starting torque is overcome, the torque or energy needed to keep the alternator moving is much less than the initial torque. Thus as long as there is wind, wind turbines may generate power even at a lower wind speed. A pulse may be an electrical signal that is either square, rectangular, triangular, exponential or other voltage that is applied for a specific duration (few milliseconds to a few minutes) at a specific frequency (from 0.1 cycles per second (or Hertz) to 10,000 cycles per second) depending on the alternator/motor capabilities. The voltage level may vary depending on the device type. For example, an alternator/motor below 1 Kilo Watt (KW) (approximately 2 Horse Power or HP) would require a voltage between 3 V to 220V—depending on the construction of the alternator/motor. Other higher HP devices may require higher voltage levels, sometimes as high as 440V or even 1200V. Lower HP devices may require lower voltage levels, sometimes as low as 0.5V.

Instant application provides a device, system, and method to allow any energy generation system or a mechanical device (for example, a wind turbine, a motor) to rotate at lower starting torque improving the overall power generator efficiency (or wind turbine efficiency).

In FIG. 1, the Anemometer (anemometer) 126 is used for measuring wind speed. In one embodiment, the information from the anemometer is used to make a decision along with other parameters whether the torque control logic 110 should generate a necessary pulse to overcome the starting torque.

In one embodiment, the power is provided by the power storage Power Storage Device (power storage device) 123 in FIG. 1. The Power storage device 123 may be a rechargeable battery or a capacitor or other technologies used for storing and retrieving power.

In another embodiment, if an external power source is not available (e.g. solar panel or other source), the disclosure may use the power generated by the system to charge the power storage device 123. A method step 128 enables the power storage device 123 to tap into the power generated by the system and provide input to generate the pulse. The torque control logic 110 may be programmed to set a threshold in a manner such that only when a rated amount of power is generated will the device start recharging.

In another embodiment, the torque control logic 110 may also be programmed to ensure that if the Power storage device 123 is running low on storage power, the power storage device may be recharged as soon as the power is generated by the system.

A Protective Diode or Relay (protective diode or relay) 114 protects the torque control logic 110 from power surges and receiving excessive power from the power generator. A Protective Diode or Relay 114 device also controls the rotation of the Alternator/Motor (alternator/motor) 120 in the correct direction.

The Alternator/Motor 120 may be the main source of power generation for this system. The electric pulse from the Pulse Generator (pulse generator) 224 is applied to this Alternator/Motor 120.

In another embodiment, the power generated by the system is converted to consumable power by an External Load Device (external load device) 118 such as an inverter. Examples of these devices are inverters, sine wave inverters, grid tie inverters, battery chargers, water heaters etc.

The embodiment shown in the FIG. 1 discloses the integrations of the components to provide a complete system. Many other components may be added to the said system and not limited to the current configuration. The Anemometer 126 is connected to the Torque Control Logic 110 on a designated port as one of the sensor. The inputs from Anemometer 126 are used to calibrate the wind speed.

The output of the torque control logic 110 is connected to a Protective Diode or Relay 114. As shown, the output of the diode is connected to the alternator or motor 120. The diode provides the polarity needed as well as protects the torque control logic 110 when the starting torque controller 100 starts producing power. The information as to whether the alternator/motor 120 is rotating and at what speed the device is rotating is observed using Path (path) 260.

The power to charge the Power storage device 123 may be obtained from power generated by the alternator/motor 120 or from external devices connected to a power source such as the power-grid. This is shown by using the path 128. The same connection may also be used to measure the power output by the alternator/motor 120, in one embodiment it may be Power Storage Device 123.

The output of the Power Storage Device 123 is connected to external load device 118 which may be used for multiple purposes. Examples of these devices are inverters, sine wave inverters, grid tie inverters, battery chargers, water heaters etc.

Figure 2:
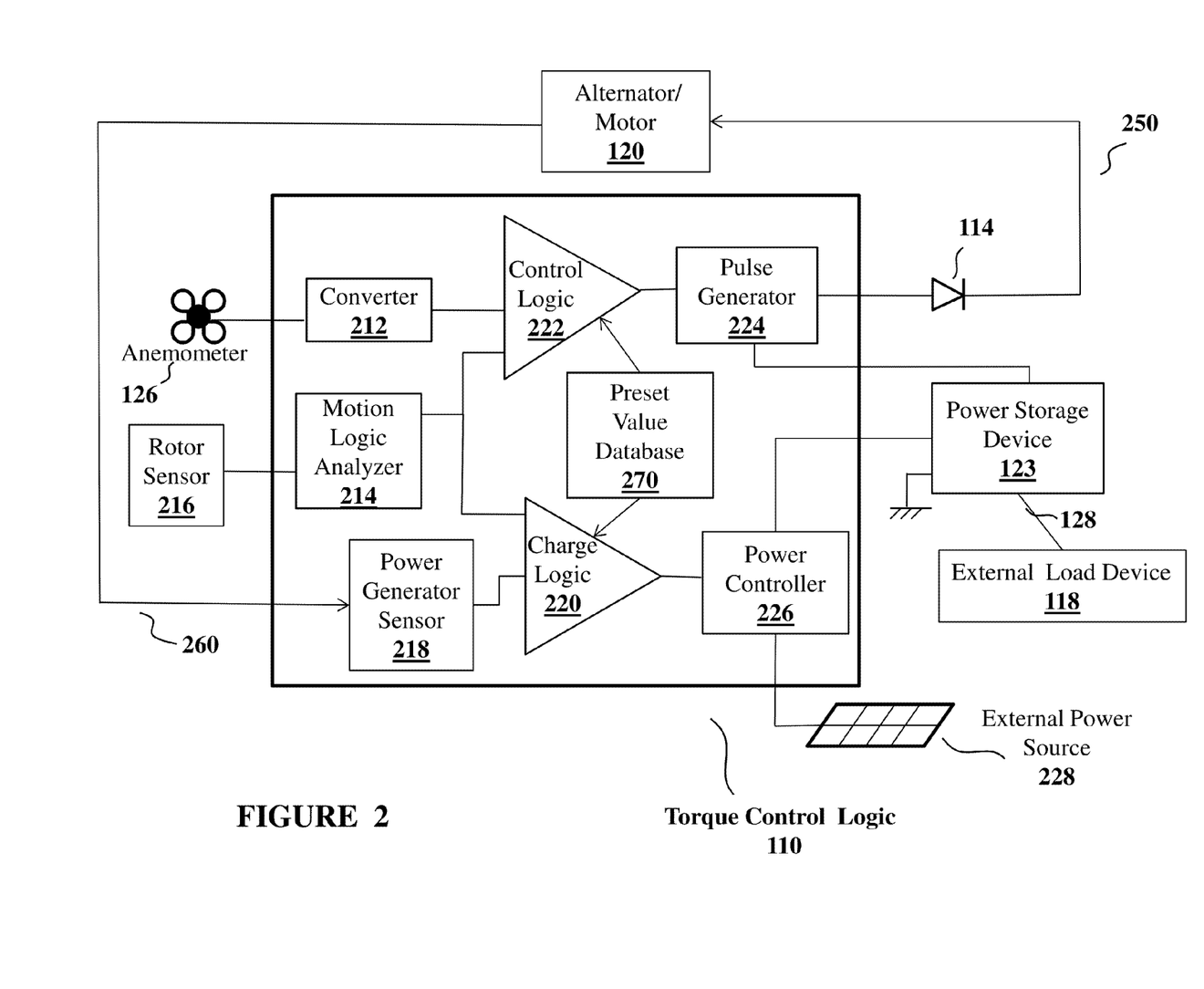
FIG. 2 is an expanded view of the wind turbine system, specifically the Torque Control Logic (torque control logic) unit 110.

FIG. 2 further discloses the torque control logic 110 in detail. The Anemometer 126 senses the wind speed. The input from the anemometer 126 may be converted into a format that may be readily understood by the Control Logic (control logic) 222. In one embodiment, an Analog to Digital and/or Digital to Analog converter (analog to digital and/or digital to analog converter) 212 may perform this function. The signal from the Anemometer 126 may change with the wind speed. For example, the faster the speed, the higher the voltage or faster the pulse rate. If the voltage is the indicator of the wind speed, the voltage level is compared to a set threshold using a control logic 222, commonly implemented using a microcontroller such as an ARM processor or PIC controller or other processor or controller. If the frequency is used as an indicator of the wind speed, frequency counter (rotor sensor) is used and that value is compared to the Preset Value Database (preset value database) 270. The rotor sensor is used for comparing the preset value database with the preset value database user input value for the starting torque reduction. Other methods to indicate wind speed are converted appropriately to indicate the proper value to the control logic 222. This information is used by the control logic 222 to make a decision as to whether or not the pulse may be generated. The information as to whether the alternator/motor 120 is rotating and at what speed the device is rotating is observed using path 122. In a similar embodiment, path 250 and 260 perform a similar function as the path 122.

In one embodiment, if the wind speed is higher than the preset value database 270 the logic then needs to validate whether or not the rotor is already moving. If the rotor is already moving, there is no need to send the pulse. If the rotor is stationary, then the pulse may be generated. The Rotor Sensor (rotor sensor) 216 may be a simple device attached to the rotor of the alternator or more sophisticated sensors such as accelerometers or Hall sensors. The sensor sends the signal regarding the rotor movement. This information is translated by the Motion Logic Analyzer (motion logic analyzer) 214.

The inputs from the preset value database 270, the speed of wind information from Converter 212, and the information from Motion Logic Analyzer 214 are combined in a combinational logic or a decision tree controlled by the microcontroller or processor to make a decision as to whether the pulse should be generated. In one embodiment, if the Alternator/Motor 120 is already rotating or moving, hence the control logic 222 concludes that no pulse is required. If the wind speed is less than the preset value database 270 and the rotor is not moving, the control logic 222 makes a decision that it is not necessary to send a control pulse. The preset value database 270 thus maintains a minimum value of the wind speed that is necessary to send a pulse. In another embodiment, if the wind speed is more than the pre-set value and the rotor is not moving already, then the pulse should be generated. The preset value database has a value for the wind speed data between 0.1 to 200 mph. The preset value database also has a value for the starting torque alternator/motor is between 0.1 to 200 N-m.

In one embodiment, once the Pulse Generator (pulse generator) 224 receives the logic to generate the pulse, it may have to make a decision as to whether the pulse should be generated or not. In one example, one may delay the pulse and monitor the wind speed information from the anemometer 126. If the wind speed shows no reduction over a period of a few seconds, the pulse may be sent. The delay information is also stored in the preset value database 270—indicating a minimum wind speed value as well as for how long should the minimum wind speed persisted before the pulse is generated. If the wind speed has reduced, the system is reset and no action may be taken.

The Pulse Generator 224, may also sense whether the Power Storage Device 123, for example a battery, has enough power. If there is insufficient power, the system should make a decision as to whether or not a power pulse (pulse) should be sent. This decision will be based on the type of battery being used. For example, with lead acid cell battery, if the charge reaches a certain threshold, the pulse will not be sent as the effective life of the battery could be reduced with further reducing the charge level. This could be over written by the logic in the Pulse Generator 224.

In one embodiment, the Control logic 222 and Pulse Generator 224 may be one and the same control block. For example, most microcontrollers today may provide this functionality as a single device. In one embodiment, Protective Diode or Relay 114 protects the Pulse generator 224 from the reverse voltage created by the alternator 120.

The Power Controller (power controller) 226 senses the power generated via the circuit path 260 and the Power Generator Sensor (power generator sensor) 218 and Charge Logic (charge logic) 220. The amount of power generated is sensed by Power Generated Sensor 218. While the Alternator 120 is not producing power, or the Motion Logic Analyzer 214 detects that the rotor is not moving, the Charge Logic 220 communicates with the Power Controller 226 that the Alternator/Motor 120 is not producing power, preventing the device from being charged from the Alternator/Motor 120. If the power generated by the Alternator/Motor 120 is more than the set threshold, the recharge circuit is enabled and the Power storage device 123 is recharged via the Power Controller 226.

Power storage device 123 may also be recharged by connecting an External Power Source (external power source) such as a solar panel device 228 or a hand crank generator connected to the Power Controller 226 or an RF charger or other sources of power. The Power Controller 226 makes charging decisions based on the logic conditions which may be set via jumpers or user interface (by presetting some set values in the logic). The conditions for charging could be:

1. Charge using external power source only such as solar panels.
2. Charge using external power source as well as self generated power.
3. Charge using self generated power only.

All components of the disclosure may be made from discrete electronic components or could be embodied into one integrated component. Many functions may be implemented in one microcontroller such as a PIC microcontroller or an ARM processor or other processors. In one embodiment, the components may be assembled on a printed circuit board with connectors for different device connectivity such as that from the anemometer, solar panel etc. This Power Storage Device 123 may be recharged using the power generated by the system or by using external power source such as a solar panel 228. One may use other sources, for example, inductive power, RF power etc. In another embodiment, an analog signal received from the anemometer is converted to digital signal for use by the Control Logic 222. In another embodiment, the pulses received from the Anemometer 126 are used directly as a digital signal for use by the Control Logic 222. In another embodiment, based on the logic and the information from the anemometer 126, an electrical pulse is sent to the alternator 120. The alternator in this embodiment acts as a motor. In another embodiment, the alternator that acts as a motor sends a power pulse to the turbine or engine. In one embodiment, the width and duration of the power pulse is programmed to overcome the inertia and the initial torque to get the turbine or motor started. Once the alternator, acting as a motor starts, the logic may keep repeating pulses till it achieves the desired speed. The speed may be sensed from the Rotor sensor 216. Depending on the use, the information from the Rotor sensor 216 is used to determine the logic as to what to do next. The pulse gap and pulse width or the duty-cycle of the pulse may be varied based on this logic. The duty cycle will vary based on the size of the alternator, the manufacturer of the alternator, or the type of alternator.

Figure 3:
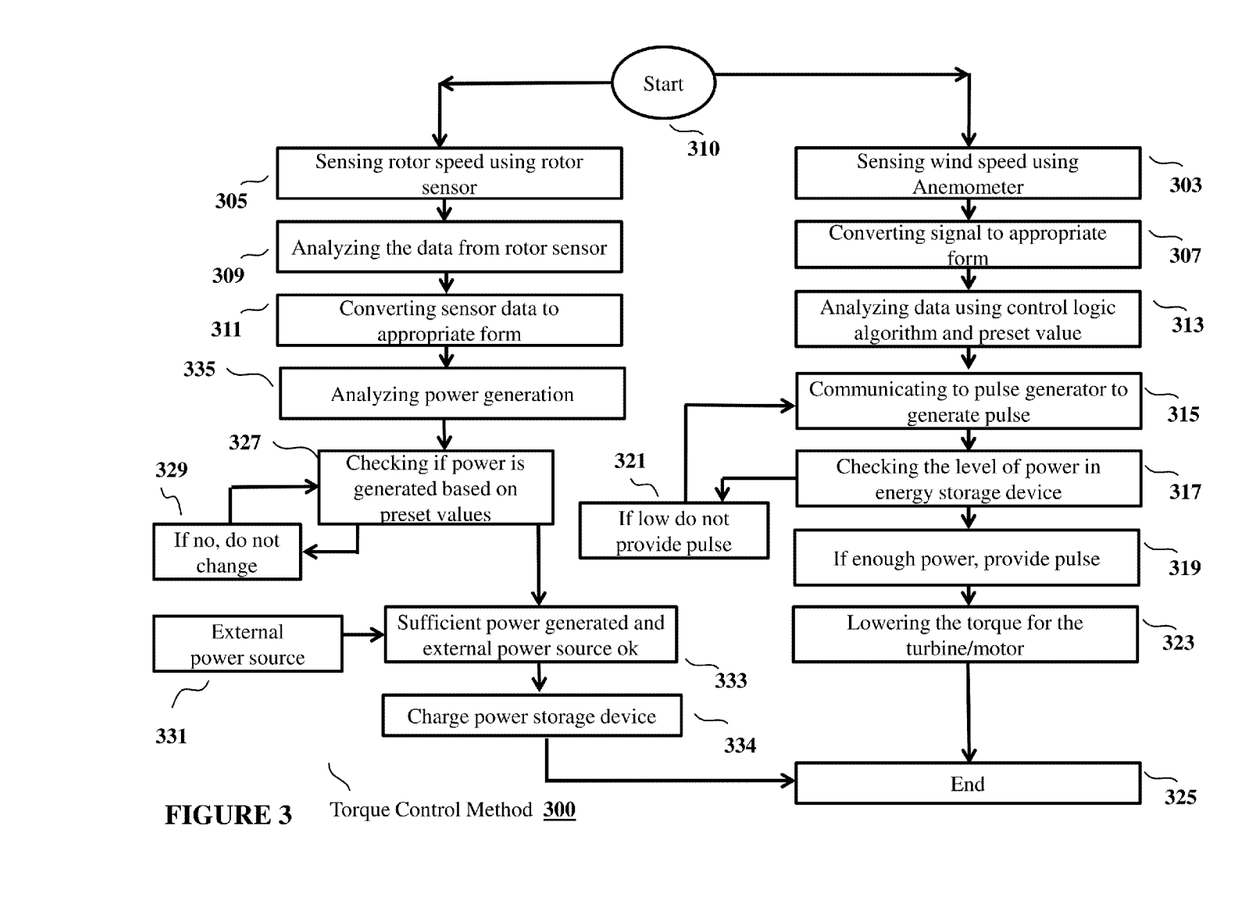
FIG. 3 illustrates a flowchart of Torque Control Method (torque control method) 300.
Figure 4:
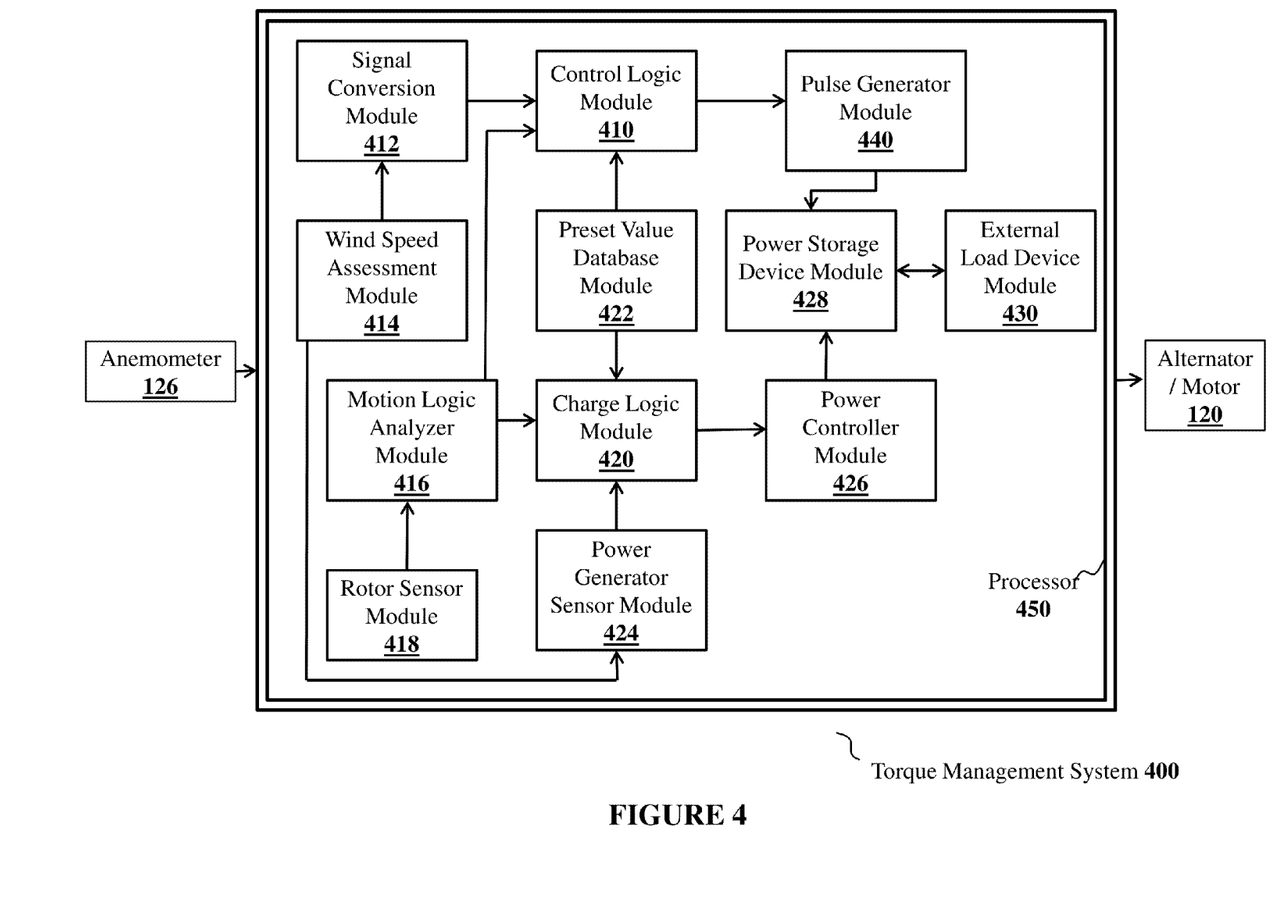
FIG. 4 illustrates a firmware comprising of many modules to work for Torque Management System (torque management system) 400.

FIG. 3 discloses a flow chart for a torque control method 300. FIG. 4 shows the modules used as a firmware for the torque management system 400. All modules in FIG. 4 are in a machine readable language in Processor (processor) 450. Anemometer 126 Senses The Wind Speed Step 303 as method with the Wind Speed Assessment Module (wind speed assessment module) 414. A determination is made if the Preset Value Database Module (preset value database module) 422 has the user input value recorded at that particular threshold for wind speed that is consistent say for about 1 second to 5 minutes. The speed of the wind velocity is also used based on the user input in preset value database 270, using the preset value database module 422. The method of using the Starting Torque Controller 100 enables the rotor sensor to estimate the initial start up wind speed or the effective wind speed. The wind speed data is used to determine the lowest threshold value of the wind speed when the pulse is applied. In another embodiment, the upper threshold value of the wind speed is used to determine when a reverse pulse is applied to slow down the system. The pulses may be repeated based on the information sensed from the wind speed data and the rotation speed data. Wherein the preset wind speed may be between 0 to 200 mph.

Rotor sensor 216 Senses the Rotor Speed Step 305 and updates the Rotor Sensor Module (rotor sensor module) 418 regarding the values. The recorded values from rotor sensor are compared to that of the preset value database 270 user input data. In the preset value database the user input for the preset wind speed may be between 0.1 to 200 mph, wind speed is between 0.1 to 200 mph and the starting torque is between 0.1 to 200 N-m, for example. It is analyzed in step 309 and if the threshold and criteria are met the sensor data is converted to appropriate form Step 311 using motion logic analyzer 214 and stored in the Signal Conversion Module (signal conversion module) 412.

The converted data is in the form of either digital or analog format. It is sent to the control logic 222. The anemometer data is also converted to Appropriate Format Step 307 and sent to the control logic 222. Control Logic Module 410 after gathering the data from Motion Logic Analyzer Module 416 and Signal Conversion Module 412, Analyses the Data Step 313. It also includes the input stored in the preset value database module 422 for its calculations. The control logic 222 may be an embedded in a microprocessor. It may also be software that may be installed in any system.

Step 315 is communicating to Pulse Generator 224 to generate pulse using the Pulse Generator Module (pulse generator module) 440. However, the pulse generator 224 gets an input from power storage device 123 regarding the level of power available in the storage and whether a pulse needs to be sent to the alternator/motor. Step 317 is checking the Level of Power in energy storage device. This decision of if Enough Power Step 319 to send the pulse and if the level is Low Not to send the Pulse Step 321 is also determined by the Pulse Generator 224.

The decision also depends on the type of power storage device 123. For example a lead acid cell battery life reduces if it is charged and discharged beyond certain levels or too rapidly. The user defined threshold in preset value database 270 would be used to determine whether a particular battery is at a rechargeable level or not. If Step 319 enough power the pulse is provided by Pulse Generator Module 440 to Lower Torque for Turbine/motor Step 323.

The alternator 126 sends pulse to power generator sensor 218 regarding how much power is the alternator generating using the Power Generator Sensor Module (power generator sensor module) 424. If the alternator is generating enough power, power generator sensor 218 senses the current and sends it to charge logic 220 via Charge Logic Module 420. The Decision if Power Generated based on preset values is Enough Step 333 or Not Step 329 the Power Storage is Charged Step 334. Charge logic 220 gets an input from preset value database 270 using the user input stored in the Preset Value Database Module (preset value database module) 422. The user input may be the power above a certain threshold, spinning of the rotor above certain rpm etc., but not limited to only these inputs. Based on the output from the charge logic 220 the power controller 226 using the Power Controller Module (power controller module) 426 decides where to pull power from external power source 228, for example solar panel or other sources to feed to the power storage device 123 using Power Storage Device module 428.

Step 335 is communicating to Power Controller 226 using the Power Storage Device Module 428, communicating with external load device 118 using External Load Device Module (external load device module) 430. Analyzing Power Generation Step 335 If Decision for Power is Generated Step 327 based on preset value database module 422 and If Decision External Power Source Step 331 is ok, then Decision Sufficient Power Generated Step 333 to Charge Power Storage Device Step 334. If Step 327 Checking if Power is Generated Based on preset value database module 422 Decision Not to Change Step 329, no Action taken.

FIG. 4 shows a firmware for the device that may be embedded in the hardware or a processor 450 or remotely controlled using an internet protocol. The system comprises of several modules that control and store various programs and data to run the starting torque controller 100 on computer having a processor. The power generated by the device, method and system may be fed into the local electrical grid system. There may be specific rules implemented at the local, central and federal level for energy production, usage and feeding green electricity produced by wind and water power to the local grid. The device, method and system will comply with local authority requirements and rules.

In addition, it will be appreciated that the various apparatus's and methods disclosed herein may be embodied as a single component, a standalone component, or part of a system. Accordingly, the specification and drawings are to be regarded in an illustrative rather than a restrictive sense.

What is claimed is:

1. A method, comprising:

sensing a wind speed using an anemometer and registering a reading as a signal;

converting the signal to a compatible signal using a converter;

a rotor sensor module for determining a speed or rotation of a turbine or alternator rotor;

comparing a data from the rotor sensor module to a preset database value using a control logic module to produce a data from the control logic module;

receiving and processing a compatible signal by the control logic module which makes a decision based on the wind speed signal along with the rotor sensor signal and preset database value whether to produce a power pulse or not to reduce a starting torque for a rotor;

producing a power pulse to be sent to an alternator rotor turbine by using a logical decision using a processor; by combining the data from the control logic module, a data from a motion logic analyzer and the preset database value only if the rotor is stationary or not moving at a low wind speed compared to the preset database value, wherein the preset database value consists of user-defined values for a wind speed, wind direction, rotor rpm, starting torque for an alternator rotor or turbine, rotor speed; user defined preset value frequency, pulse width and corresponding voltage, wherein a value for the wind speed data between 0.1 to 200 miles per hour, wherein a value for the starting torque alternator rotor or turbine between 0.1 to 200 Newton-meter, wherein the motion logic analyzer converts a voltage or pulses from the rotor sensor and converts that to a speed of the turbine and/or alternator rotor in a compatible format for the torque control logic.

2. The method of claim 1, wherein the signal is at least one of an analog signal and a digital signal, wherein the compatible signal is at least one of an analog and digital.

3. The method of claim 1, further comprising: performing the logical decision for checking the level of a power in an energy storage device for at least one of a sufficient and a deficient power level.

4. The method of claim 3, further comprising: estimating at least one of the level of pulse and pulse width needed using the preset value database entered by the user as a measure.

5. The method of claim 3, further comprising:
obtaining power from at least one of an external or internal power source to charge the power storage device if there is the deficient power in the power storage device.

6. The method of claim 3, further comprising:
supplying power to a local electrical grid under a local authority rule.

7. A system, comprising:
a processor comprising of several modules to perform a calculation for lowering a starting torque for a mechanical device;
a wind or a wind-energy assessment module to gather a signal from an anemometer and compare it to a preset database value;
a signal conversion module to convert the signal to an appropriate format for a control logic module to accept the appropriate format of signal;
the control logic module to receive the preset database value created by an user from the preset value database module, the signal conversion module and a motion logic analyzer module that converts to a voltage or pulses from a rotor sensor module and converts that to a speed of a turbine or alternator rotor in a compatible format for the torque control logic to produce a pulse to start the turbine or alternator rotor not moving, wherein a value for the wind speed data is between 0.1 to 200 miles per hour, wherein a value for a starting torque for the alternator rotor or turbine is between 0.1 to 200 Newton-meter;
a rotor sensor module to create an input from the turbine or alternator rotor.

8. The system of claim 7, further comprising:
a motion logic analyzer module to receive input from a rotor sensor module for the speed of rotation for a turbine or alternator rotor motor.

9. The system of claim 8, further comprising:
a charge control module to calculate the sufficiency of the power after comparing the input with the preset value database module.

* * * * *